(12) United States Patent
Stanek et al.

(10) Patent No.: US 9,587,576 B2
(45) Date of Patent: Mar. 7, 2017

(54) METHODS AND SYSTEM FOR IMPROVING VEHICLE OPERATION

(71) Applicant: Ford Global Technologies, LLC, Dearborn, MI (US)

(72) Inventors: Joe F. Stanek, Northville, MI (US); Jeffrey Allen Doering, Canton, MI (US); Tony Lockwood, Canton, MI (US); Sam Hashemi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 767 days.

(21) Appl. No.: 13/851,784

(22) Filed: Mar. 27, 2013

(65) Prior Publication Data

US 2014/0297161 A1    Oct. 2, 2014

(51) Int. Cl.
| | |
|---|---|
| *G06F 7/00* | (2006.01) |
| *G06F 17/00* | (2006.01) |
| *F02D 41/30* | (2006.01) |
| *F02D 41/24* | (2006.01) |
| *F02D 41/14* | (2006.01) |
| *F02D 41/18* | (2006.01) |
| *F02D 41/00* | (2006.01) |
| *F02D 41/26* | (2006.01) |
| *B60L 11/14* | (2006.01) |
| *F02D 41/04* | (2006.01) |
| *F02D 41/06* | (2006.01) |
| *F02D 11/10* | (2006.01) |
| *G07C 5/00* | (2006.01) |

(52) U.S. Cl.
CPC .............. *F02D 41/30* (2013.01); *B60L 11/14* (2013.01); *F02D 41/0002* (2013.01); *F02D 41/1454* (2013.01); *F02D 41/182* (2013.01); *F02D 41/2429* (2013.01); *F02D 41/266* (2013.01); *F02D 11/105* (2013.01); *F02D 41/042* (2013.01); *F02D 41/062* (2013.01); *F02D 41/2454* (2013.01); *F02D 41/2464* (2013.01); *F02D 41/2467* (2013.01); *F02D 41/2474* (2013.01); *F02D 2200/602* (2013.01); *G07C 5/008* (2013.01); *Y02T 10/42* (2013.01); *Y02T 10/70* (2013.01); *Y02T 10/7077* (2013.01); *Y02T 90/16* (2013.01)

(58) Field of Classification Search
CPC ............... F02D 41/266; F02D 41/2429; F02D 41/2454; F02D 11/05; G07C 5/008; G06F 19/00
USPC ................ 701/33.4, 102–104, 109, 115, 117
See application file for complete search history.

(56) References Cited

U.S. PATENT DOCUMENTS

| | | | |
|---|---|---|---|
| 6,512,974 B2 | 1/2003 | Houston et al. | |
| 7,162,339 B2 * | 1/2007 | Nguyen | ...................... 701/29.3 |
| 7,280,898 B2 * | 10/2007 | Lesesky | ................. G07C 5/008 |
| | | | 701/31.5 |
| 7,437,236 B2 | 10/2008 | Garcia et al. | |
| 7,882,789 B2 * | 2/2011 | Kumar et al. | .................. 105/27 |

(Continued)

*Primary Examiner* — Mahmoud Gimie
*Assistant Examiner* — David Hamaoui
(74) *Attorney, Agent, or Firm* — Julia Voutyras; John D. Russell; B. Anna McCoy

(57) ABSTRACT

A method and system improving vehicle operation is presented. In one example, the vehicle data is transmitted between a vehicle and a cloud computer. The cloud computer adjusts engine control parameters and the vehicle is operated based on the adjusted engine control parameters.

7 Claims, 4 Drawing Sheets

(56) References Cited

U.S. PATENT DOCUMENTS

| | | | |
|---|---|---|---|
| 8,983,713 B2* | 3/2015 | Shinohara | H04Q 9/00 |
| | | | 700/112 |
| 9,152,938 B2* | 10/2015 | Lang | A01B 79/005 |
| 9,189,896 B2* | 11/2015 | Ghoneim | G07C 5/008 |
| 9,292,978 B2* | 3/2016 | Hunt | G07C 5/008 |
| 2002/0052682 A1 | 5/2002 | Chatfield et al. | |
| 2008/0167758 A1* | 7/2008 | Louch | H04L 12/66 |
| | | | 701/2 |
| 2010/0082225 A1* | 4/2010 | Bournel et al. | 701/115 |
| 2011/0270468 A1 | 11/2011 | Kristinsson et al. | |

\* cited by examiner

METHODS AND SYSTEM FOR IMPROVING VEHICLE OPERATION

FIELD

The present description relates to methods and system for improving vehicle operation during varying driving conditions. The method may be particularly useful for adjusting parameters of separate vehicle systems that share common feedback sources and which do not provide direct information regarding variables of the separate vehicle systems.

BACKGROUND AND SUMMARY

A vehicle may include an engine control system for improving engine operation. The engine control system may be divided into several subsystems that may or may not be closely related. For example, an engine control system may include a fuel delivery system as well as an air charge estimation and regulation system. Further, the engine control system may also include an ignition system, fuel vapor management system, exhaust emissions system, an exhaust gas recirculation (EGR) system, valve timing system, and other such systems. The engine system, including each subsystem, may operate based on transfer functions that attempt to describe device operation as well as on open loop and closed loop commands. The open loop commands may be empirically determined during engine testing and stored in memory for use during selected operating conditions. The closed loop commands may be based on data that is collected and fed back to the engine system during vehicle operation.

The engine system may also adapt selected control parameters to compensate for errors that may be present in device transfer functions and/or open loop commands. In some examples, the control parameters may not be directly observable to determine whether or not the control parameters are converging to desired (e.g., optimal) values. Further, the control parameters may be adapted in response to present operating conditions without regard to prior operating conditions since the engine system has limited capacity to store vehicle data. For example, an engine system may include air and fuel management systems. The engine air amount may be estimated based on a manifold absolute pressure (MAP) sensor or air meter. The engine fuel amount may be estimated from fuel injection pulse widths. Correction to the air and fuel estimates may be based on output of an oxygen sensor that has no capacity to directly distinguish between air system errors and fuel systems errors. Consequently, air system control parameters and fuel system control parameters may be arbitrarily assigned portions of an air-fuel ratio error amount. Consequently, air system and fuel system corrections may not compensate for air system and fuel system errors as is desired.

The inventors herein have recognized the above-mentioned disadvantages and have developed a method for a vehicle, comprising: collecting data without driver input from a single source that is correlated to two regulated engine inputs while the vehicle is on a road; processing the data off-board the vehicle into control adjustments for the two regulated engine inputs; and operating the vehicle in response to the control adjustments.

By exporting vehicle data to an off-board processing system, it may be possible to improve adaptation of control parameters such as sensor and actuator transfer functions so that vehicle performance may be improved. For example, an engine exhaust gas oxygen sensor outputs data that may be related to an engine air charge control system and an engine fuel control system. Vehicle data including oxygen sensor data, air sensors, and fuel injection times may be organized into specific operationally separated data groups (e.g., engine starting data, engine stopping data, steady state data, and transient data) that are transmitted to a processing unit that is remote from the vehicle. The remote processing unit may process a large group of data that was acquired during varying operating conditions to adjust one or more sensor and/or actuator transfer functions based on the large group of data. The large group of data may allow the processing unit to determine if particular errors in the observed data may be attributed to either the fuel system or the air charge system. Fuel delivery system control variables are adjusted according to errors attributed to the fuel delivery system. Engine air charge system control variables are adjusted according to errors attributed to the engine air charge system.

The present description may provide several advantages. In particular, the approach may allow an engine to operate more efficiently. Further, the approach may reduce engine emissions. Further still, the approach may account for system errors that develop over a length of time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
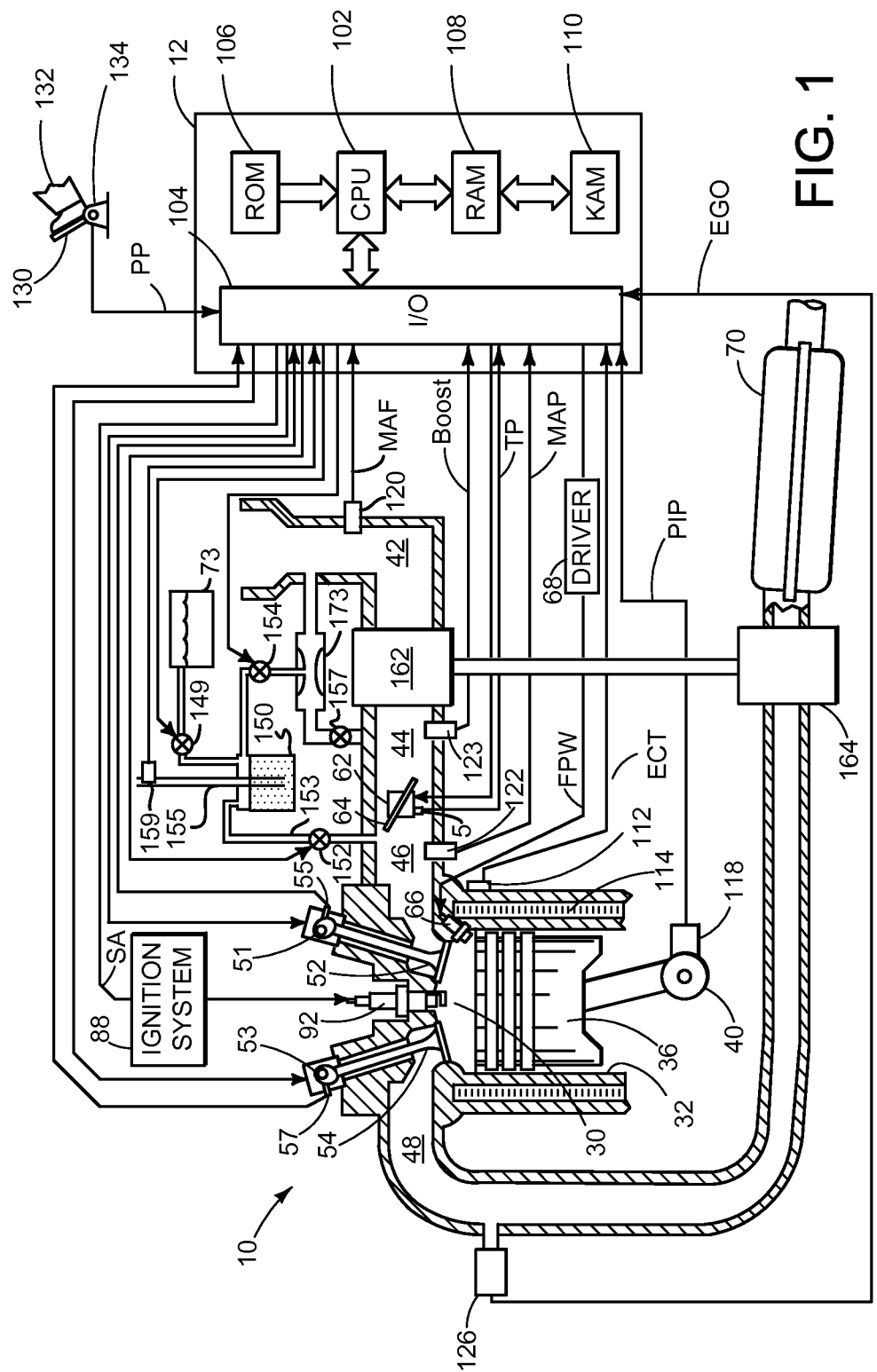
FIG. 1 is a schematic diagram of an engine.
Figure 2:
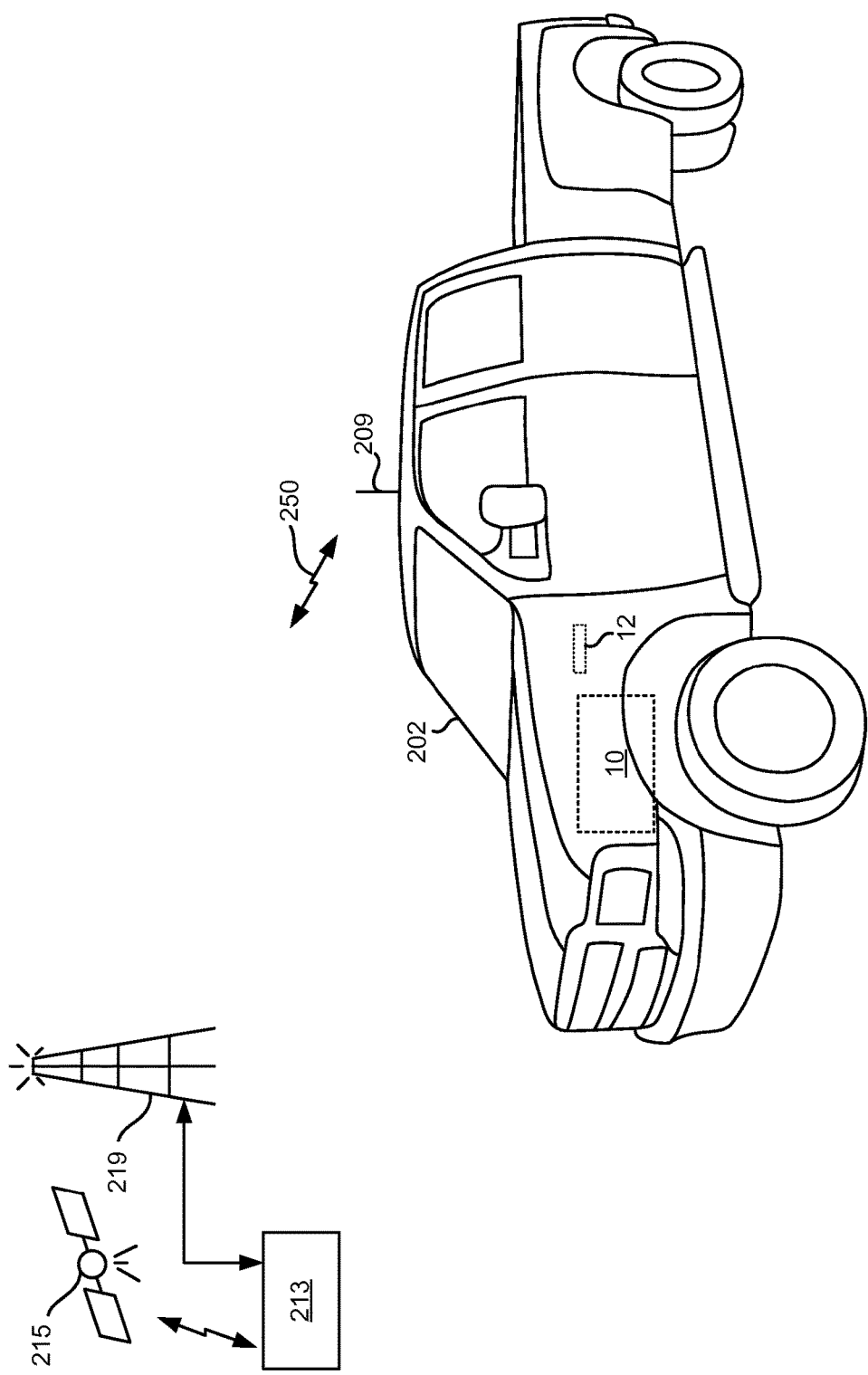
FIG. 2 is a schematic diagram of a vehicle system in which the engine of FIG. 1 operates.
Figure 3:
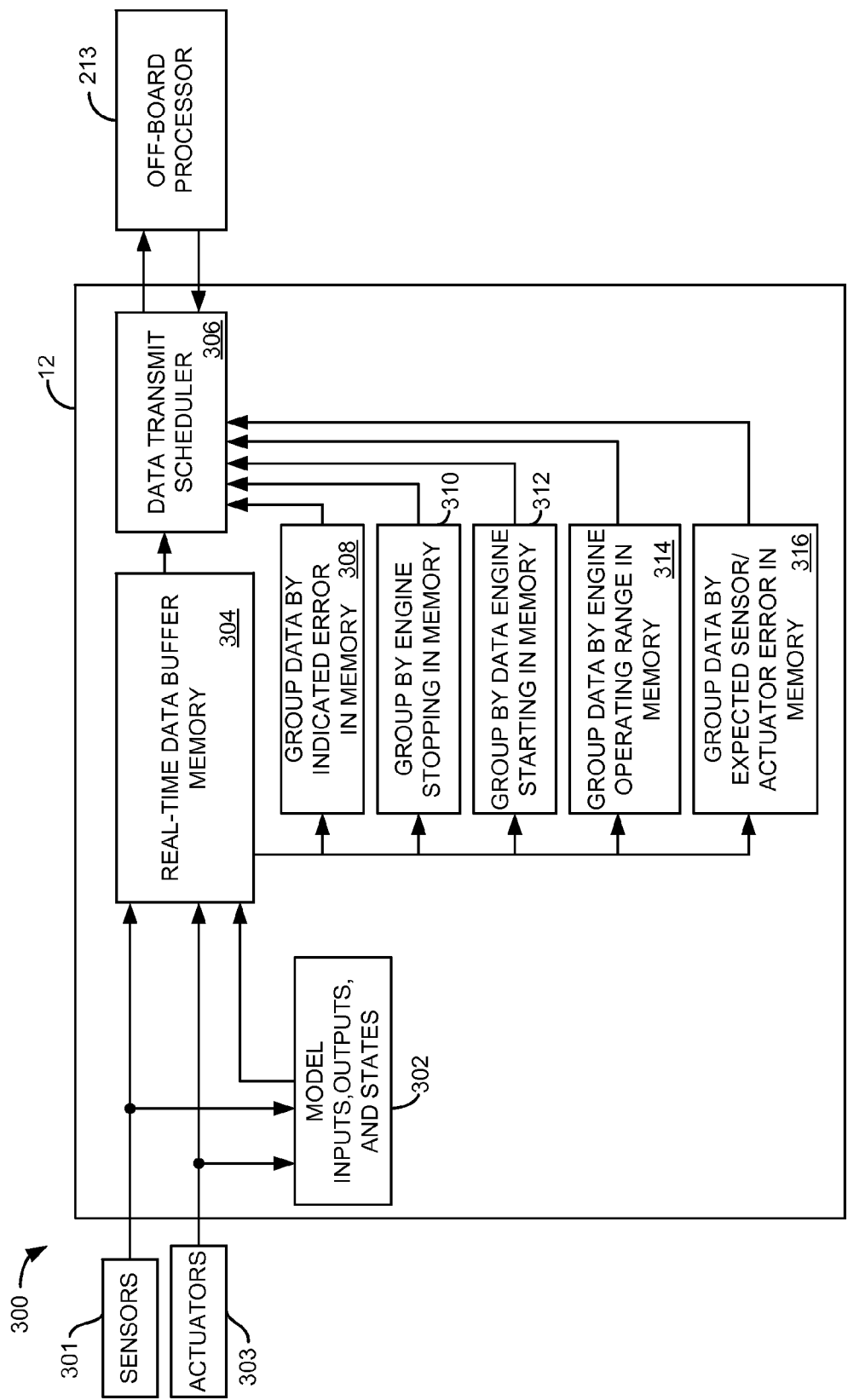
FIG. 3 is an example diagram of vehicle data collection organization.
Figure 4:
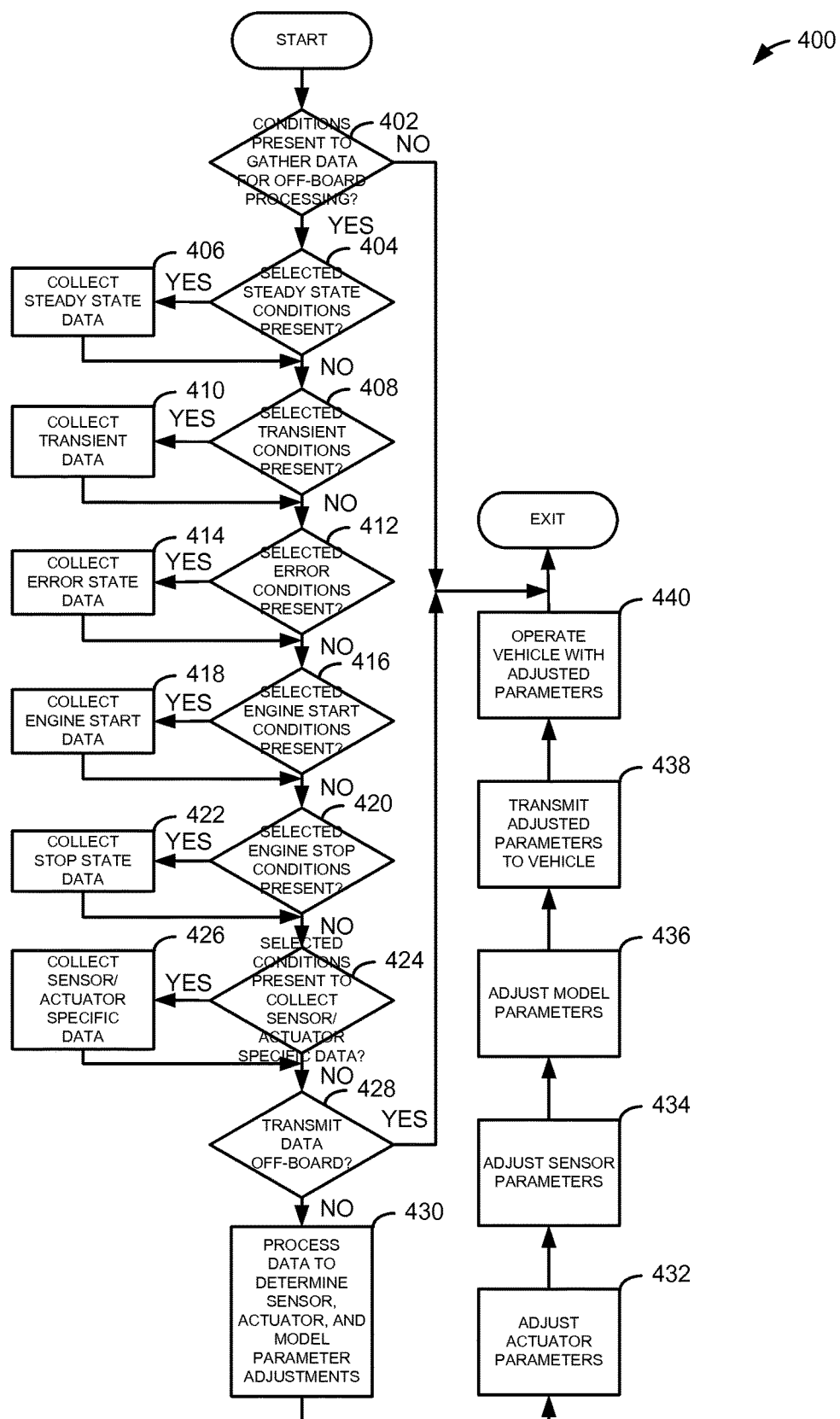
FIG. 4 is an example flowchart of a method for improving vehicle operation.

The present description is related to improving engine control parameters and operating a vehicle with updated engine control parameters. In one non-limiting example, the engine may be configured as illustrated in FIG. 1. The engine may be part of a vehicle as is shown in FIG. 2. Engine torque data may be processed on-board a vehicle by a vehicle controller while concurrently, the same engine data is processed off-board the vehicle by a cloud computing system. The off-board processing may include a larger number of constraints and/or parameters, and consequently may be more computation intensive than the on-board processing. The vehicle controller may be configured to perform a routine to process the engine data on-board the vehicle and determine slopes and/or offset modifiers with which all the data points of an engine torque data set are adjusted. At the same time, the controller may upload the data to an off-board controller that determines independent adjustments for one or more data points in the engine torque data set. The independent adjustments may be downloaded by the vehicle controller and used to further update the engine torque data set. Engine operations may then be adjusted based on the updated data set. In this way, by performing some processing on-board and additional processing off-board, the accuracy of torque control may be improved. FIG. 3 shows a block diagram of how acquired engine data may be organized for processing. FIG. 4 shows an example method for improving sensor, actuator, and modeling parameters.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. Fuel flow through fuel injector 66 may be regulated by controller 12 adjusting fuel pressure and fuel injector on time.

Intake manifold 46 is shown communicating with optional electronic throttle 62 which adjusts a position of throttle plate 64 to control air flow from intake boost chamber 44. Air flow past throttle plate 64 may be regulated by controller 12 adjusting a position of throttle plate 64. Compressor 162 draws air from air intake 42 to supply intake boost chamber 44. Exhaust gases spin turbine 164 which is coupled to compressor 162. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbocharger compressor 164 and catalytic converter 70. Alternatively, a two-state exhaust gas oxygen sensor may be substituted for UEGO sensor 126. Oxygen sensor 126 a single sensor source that is correlated to two engine actuators (e.g., fuel injector and a throttle).

Converter 70 can include multiple catalyst bricks, in one example. In another example, multiple emission control devices, each with multiple bricks, can be used. Converter 70 can be a three-way type catalyst in one example.

Fuel vapor storage canister 150 contains activated carbon or other known media to temporarily store fuel vapors. Fuel vapors may originate from the fuel tank 73, the intake manifold, or other point in the fuel system. Valve 149 controls the flow of fuel vapors from fuel tank 73 to fuel vapor storage canister 150. Canister purge control valve 152 controls flow of fuel vapors from fuel vapor storage canister 150 to intake manifold 46. Further, passage 153 is supplied fixed density ambient air though passage 155 and mass flow through valve 152 and passage 153 becomes choked or sonic at pressure ratios less than 0.528. Therefore, pressure ratios across valve 152 and passage 153 are limited to greater than 0.528 since lower pressure ratios provide no higher flow rates. Fresh air may be drawn into fuel vapor storage canister 150 via vent passage 155. In some examples, a valve may be positioned along vent passage 155 to control the flow of fresh air into fuel vapor storage canister 150. Hydrocarbon sensor 159 provides an indication of an amount of hydrocarbons stored in fuel vapor storage canister 150.

Fuel vapor storage canister 150 can also purge fuel vapors to air intake 42 via venturi 173. When compressor 162 produces a positive pressure in boost chamber 44, venturi control valve 157 can be partially or fully opened or modulated to allow air to flow from boost chamber 44 through venturi 173 and into air intake 42. A pressure drop occurs in venturi 173 creating a low pressure region when air flows through venturi 173 from compressor 162. Lower pressure at venturi 173 induces flow from fuel vapor storage canister 150 to venturi 173 when canister venturi control valve 154 is at least partially open. The pressure drop at venturi 173 is related to the venturi design and the velocity of air flow through the venturi. In one example, valves 154 and 157 are set to an open state when flow from the fuel vapor storage canister 150 to the air intake 42 is desired. A pressure ratio of less than 0.528 across venturi 173 or valve 157 can provide sonic velocity of air through venturi 173 and valve 62. In one example, the pressure ratio across venturi 173 and valve 157 is limited to greater than 0.528 because lower pressure ratios may provide smaller increases in mass flow rate as the density in boost chamber 44 is increased.

Canister vacuum control valve 152 can be opened so that there is flow from fuel vapor storage canister 150 to intake manifold 46 and air intake 42 while there is or is not flow from fuel vapor storage canister 150 to venturi 173. For example, when intake manifold pressure is slightly below atmospheric pressure, a small amount of flow to the intake manifold 46 may be generated. At the same time, venturi 173 may draw flow from fuel vapor storage canister 150.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold absolute pressure (MAP) from pressure sensor 122 coupled to intake manifold 46; a measurement of boost pressure from pressure sensor 123; a measurement of air mass entering the engine from sensor 120; and a measurement of throttle position from a sensor 5. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Each of the sensors and/or actuator shown in FIG. 1 may include a transfer function that describes operation of the sensor or actuator. For example, a fuel injector includes a transfer function that describes fuel flow through the fuel injector based on fuel pressure and fuel injector on time. An air meter includes a transfer function that relates air flow through the air meter to a voltage output from the air meter. Further, engine volumetric efficiency and engine air flow may be described via models and or transfer functions stored in controller memory.

FIG. 2 shows a schematic view of an example system for adjusting engine and fuel system control variables. The system includes a vehicle 202 in which engine 10 and controller 12 may be positioned. Vehicle 202 may transmit data from sensors, actuators, control models to off-board processing unit 213 via antenna 209. Data may be transmitted to satellite 215 or infrastructure 219 (e.g., a tower).

In the depicted example, off-board processing unit 213 is a cloud computing system that is communicatively coupled to the on-board vehicle control system. For example, the control systems may be coupled via wireless communication 250 which can be Wi-Fi, Bluetooth, any type of cellular service or any generic wireless data transfer protocol. As such, this connectivity where the vehicle data is uploaded, also referred to as the "cloud", may be a service such as "Airbiquity Service", an alternate commercial service or a private server where the data is stored and then acted upon by optimization algorithms. The algorithms may process the data from a single vehicle, a family of engines, a family of powertrains, or a combination thereof. The algorithms may further take into account the system limitations, produce air-fuel transfer function modifiers that are properly constrained, and send them back to the vehicle where they are applied.

Control parameters determined from processing data at processing unit 213 may be transmitted to vehicle 202 via satellite 215 and/or infrastructure 219. Data may be transmitted bi-directionally between vehicle 202 and processing unit 213. Additionally, the off board processor 213 may be owned and operated by a vehicle manufacturer, whereas vehicle 202 may be owned and operated by a private party other than the vehicle manufacturer. Further, off board processor 213 may process data for a plurality of vehicles owned by a plurality of different owners.

Therein, the vehicle control system 12 may adjust an engine air-fuel data set using a computation model that determines torque adjustment slopes and/or offset modifiers that are applied to all data points in the air-fuel data set, en masse. For example, each and every data point of the data set may be adjusted in the same manner, with the same modifier. In parallel, the inputs from the various sensors and the on-board torque adjustments may be uploaded to an off-board processor, such as a cloud computing system communicatively coupled to the on-board control system, wherein the engine air-fuel data may be analyzed in a more computation intensive manner using a computation model having a larger number of constraints and parameters. The off-board processor may adjust one or more individual data points independently. For example, only some of the data points of the data set may be adjusted, and the adjustments of the affected data points may be different from, and independent of each other.

Thus, the system of FIGS. 1 and 2 provides for a vehicle performance improvement system, comprising: a vehicle including an engine; a data processing unit external from the vehicle; and a controller including executable instructions stored in non-transitory memory to transmit data from a single source that is correlated to two engine control devices, the data transmitted to the data processing unit external from the vehicle, and additional executable instructions for receiving revised engine actuator transfer functions.

In some examples, the vehicle performance improvement system further comprises additional executable instructions for receiving revised engine sensor transfer functions. The vehicle performance improvement system includes where the vehicle is owned by a private party other than a vehicle manufacturer, and where the data processing unit external from the vehicle is owned by the vehicle manufacturer. The vehicle performance improvement system further comprises additional executable instructions for parsing steady state data and transient data from the single source, and where the single source is an exhaust gas sensor. The vehicle performance improvement system also further comprises additional executable instructions for separating engine starting data and engine stopping data from the single source, and where the single source is an exhaust gas sensor. The vehicle performance improvement system further comprises a transmitter and a receiver within the vehicle.

Referring now to FIG. 3, a block diagram of one way to organize vehicle data for remote processing is shown. The process and functionality illustrated in the block diagram of FIG. 3 may be stored as executable instructions in non-transitory memory of controller 12. Block diagram 300 includes sensors 301 and actuators 303. Sensors 301 may be comprise any sensor shown in FIG. 1 as well as other sensors (e.g., fuel pressure sensor, vehicle speed sensor, etc.). Actuators 303 may be comprise any actuator shown in FIG. 1 as well as other actuators (e.g., fuel pump, vacuum pump, etc.). Data from sensors 301 and actuators 303 may be input to models 302 and real-time data buffer memory 304. Models 302 may include engine volumetric efficiency models, transfer functions (e.g., fuel injector fuel flow transfer functions), transient fuel models, engine torque estimation models, fuel vapor storage models, engine exhaust temperature models, exhaust gas recirculation (EGR) models, and other engine related models. On-board measurements of air-fuel ratio deviations (measured), controller corrections (commanded) and the sensor and actuator signals and conditions (temperatures, pressures) associated with each data point may captured and stored to memory. In systems where multiple injection systems are involved, data regarding each fuel system including the portion of fuel being delivered by each injection system. Values of any variables and adaptive parameters affecting the transfer function for air and fuel sensors and actuators may be captured and stored to memory for subsequent upload to the cloud.

Real-time data buffer memory 304 may store sensor, actuator, and model data for a predetermined number of sampling events. For example, memory 304 may include 500 samples of a group of data representing 50 sensors, actuators, and/or model variables. The plurality of sensors, actuators, and model variables may be simultaneously sampled via sample and hold circuitry. The samples may be stored once a second so that 10 seconds of data from 50 sensor, actuators, and model variables are stored in the 500 samples. Of course, other sampling intervals, number of samples, number of sensors, actuators, and variables are also possible. In one example, real time data buffer 304 is a first in-first out data buffer.

The data buffer may be arranged to hold a predetermined number of sample sets, where each sample set is comprised of samples from selected sensors, actuators, and model variables. When a new sample set enters the data buffer, other sample sets are pushed toward the end of the data buffer and the last sample set is over written and removed from the data buffer. In this way, a continuous stream of data may be held in controller memory.

Data may be directed from the real-time data buffer to other areas of memory based on selected conditions. In particular, data may be stored in a portion of memory allocated for data that captures error conditions that exceed a threshold error amount at memory 308. For example, selected variables (e.g., fuel pulse width, fuel pressure, engine air amount, MAP sensor) may be stored when an exhaust gas based engine air-fuel ratio as estimated from an exhaust gas oxygen sensor exceeds a threshold air-fuel ratio from a desired engine air-fuel ratio. Other examples of stored error data may include but are not limited to fuel vapor storage amount estimate, engine air charge estimate, EGR error, ignition timing error, and injected fuel amount or mass. The stored error data may include data sets captured during error conditions over a variety of engine operating conditions. For example, the stored error data may include steady-state (e.g., constant engine speed and load) data captured at 0.3 load and 1500 RPM as well as transient data captured at 2500 RPM and a load of 0.3-0.5. Grouping engine error data in to a specific section of memory allows controller 12 to transmit only engine error data if desired so that data processing time and data transmission time may be reduced. Further, data processing may be targeted to engine operating conditions that may offer the most benefit for the least amount of processing and transmission time.

Selected data acquired during engine stopping may be stored at memory 310. Example engine stopping data may include but is not limited to engine stopping position, fuel pressure, engine air-fuel ratio as determined from an oxygen sensor, engine air amount, and engine speed. Grouping engine stopping data into a specific section of memory allows controller 12 to transmit only engine stopping data if desired so that data processing time and data transmission time may be reduced.

Selected data acquired during engine starting may be stored at memory 312. Example engine starting data may include but is not limited to engine cranking time, fuel pressure, engine air-fuel ratio as determined from an oxygen sensor, engine air amount, and engine speed. Grouping engine starting data into a specific section of memory allows controller 12 to transmit only engine starting data if desired so that data processing time and data transmission time may be reduced.

Selected data acquired during selected engine operating conditions (e.g., specific engine speed and load conditions) may be stored at memory 314. Example engine data may include but is not limited to engine temperature, fuel pressure, engine air-fuel ratio as determined from an oxygen sensor, engine air amount, and engine speed. Grouping engine data from specific engine operating conditions into a specific section of memory allows controller 12 to transmit only engine data acquired during selected operating conditions if desired so that data processing time and data transmission time may be reduced.

Selected data acquired during selected conditions where sensor/actuator data error may be expected to be least or greatest depending on expected sensor/actuator performance. For example, engine data from selected sensors, actuators, and models may be stored in memory 316 when MAP sensor error is expected to be less than a threshold error amount. By grouping engine data in response to sensor and actuator errors, it may be possible to capture data that is more accurate than during other conditions so that transfer functions and model parameters may be updated with greater accuracy.

Data stored in memory may be transmitted to off-board processor 213 via data transmission scheduler 306. In one example, transmission schedule may transmit data to off-board processor 213 when error data is stored in memory 308. Data transmission scheduler 306 may also transmit data to off-board processor 213 at predetermined intervals (e.g., every 10,000 miles or every 100 operating hours). Data scheduler 306 may also be commanded by off-board processor 213 to acquire data at specific times and/or conditions.

In this way, data from a vehicle transmitted to an off-board processor may be organized to conserve processing resources. Further, data acquisition resources may be reserved for selected conditions so that other operations may be performed without delay.

Referring now to FIG. 4, a flowchart of a method for adjusting parameters of vehicle systems is shown. The method of FIG. 4 may be stored as executable instructions in non-transitory memory in the system illustrated in FIG. 1. The method of FIG. 4 may be executed without input from the vehicle driver while the vehicle is traveling on a road.

At 402, method 400 judges whether or not conditions are present for gathering vehicle data for off-board (e.g., external to the vehicle) processing. Conditions may include but are not limited to selected engine operating conditions (e.g., specific engine temperature, barometric pressure, engine speed, engine load, etc.). Further, conditions may include operating conditions where sensors and data have a high signal to noise ratio. In one example, controller 12 of FIG. 1 recognizes near steady speed, torque, and load conditions. The controller may proceed to take a snap shot of data and parameters at the recognized conditions for storage in a packet of information that may be subsequently uploaded to the cloud. If method 400 judges that conditions are present for gathering vehicle data, the answer is yes and method 400 proceeds to 404. Otherwise, the answer is no and method 400 proceeds to exit.

At 404, method 400 judges whether or not selected steady state conditions are present to acquire vehicle, engine, and fuel system data. Steady state conditions may include vehicle conditions (e.g., substantially constant vehicle speed (±3 KPH)), engine conditions (e.g., substantially constant engine speed (±100 RPM), substantially constant engine load (±0.05 load), substantially constant throttle position (±3 degrees)), or fuel system conditions (e.g., substantially constant fuel pressure (e.g., ±20 KPA). If method 400 judges that selected steady state conditions are present, the answer is yes and method 400 proceeds to 406. Otherwise, the answer is no and method 400 proceeds to 408.

At 406, method 400 schedules and acquires (e.g., stores to memory) selected data at selected sample intervals. For example, a set of sample data comprised of engine speed, engine air amount or mass, EGR amount, fuel vapor flow, ignition timing, engine injected fuel amount or mass, MAP, engine volumetric efficiency, engine air-fuel ratio as determined from an oxygen sensor, and fuel pressure are stored to memory every 50 ms. A predetermined number data sample sets may be stored to memory (e.g., 500 sample sets). Method 400 proceeds to 408 after data set sampling has been scheduled.

At 408, method 400 judges whether or not selected transient conditions are present to store vehicle, engine, and fuel system data. Transient conditions may include vehicle conditions (e.g., a change in vehicle speed greater than a threshold vehicle speed (±5 KPH/sec)), engine conditions (e.g., a change in engine speed (±100 RPM/sec), change in engine load (±0.1/sec load), change in throttle position (±10 degrees/sec)), or fuel system conditions (e.g., change in fuel pressure (e.g., ±20 KPA/sec). If method 400 judges that selected transient conditions are present, the answer is yes and method 400 proceeds to 410. Otherwise, the answer is no and method 400 proceeds to 412.

At 410, method 400 acquires (e.g., stores to memory) selected data at selected sample intervals. For example, a set of sample data comprised of engine speed, engine air amount, engine injected fuel amount, MAP, engine volumetric efficiency, engine air-fuel ratio as determined from an oxygen sensor, and fuel pressure are stored to memory every 1 ms. A predetermined number data sample sets may be stored to memory (e.g., 5000 sample sets). In one example, vehicle, engine, and fuel system data is stored to a data buffer as described in FIG. 3 so that a predetermined number of sample data sets occurring before the transient condition and after the transient condition may be stored to memory. In this way, conditions leading up to and after the transient event may be stored to memory. Method 400 proceeds to 412 after data set storage to memory has been scheduled.

At 412, method 400 judges whether or not selected error conditions are present to store vehicle, engine, and fuel system data. Error conditions may include vehicle error conditions (e.g., a vehicle speed deviating from a desired vehicle speed (e.g., an error in vehicle speed greater than ±2 KPH)), engine conditions (e.g., an error between desired engine air-fuel ratio and actual engine air-fuel ratio greater than a threshold error amount (e.g., ±0.06 air-fuel ratio), an error between engine load and desired engine load (e.g., ±0.06 load), an error between throttle position and desired throttle position (e.g., ±5 degrees/)), or fuel system error conditions (e.g., an error between fuel pressure and desired fuel pressure (e.g., ±10 KPA). If method 400 judges that selected error conditions are present, the answer is yes and method 400 proceeds to 414. Otherwise, the answer is no and method 400 proceeds to 416.

At 414, method 400 acquires (e.g., stores to memory) selected data at selected sample intervals. For example, a set of sample data comprised of engine speed, engine air amount, engine injected fuel amount, MAP, engine volumetric efficiency, engine air-fuel ratio as determined from an oxygen sensor, engine air-fuel ratio error, and fuel pressure are stored to memory every 1 ms. A predetermined number data sample sets may be stored to memory (e.g., 5000 sample sets). In one example, vehicle, engine, and fuel system data is stored to a data buffer as described in FIG. 3 so that a predetermined number of sample data sets occurring before the error condition and after the error condition may be stored to memory. In this way, conditions leading up to and after the error event may be stored to memory. Method 400 proceeds to 416 after data set storage to memory has been scheduled.

At 416, method 400 judges whether or not selected engine starting conditions are present to store vehicle data. Engine starting conditions may include but are not limited to time since engine stop, time since engine start, change in MAP, engine speed, engine load, and other conditions indicative of engine starting. If method 400 judges that selected engine starting conditions are present, the answer is yes and method 400 proceeds to 418. Otherwise, the answer is no and method 400 proceeds to 420.

At 418, method 400 acquires (e.g., stores to memory) selected data at selected sample intervals. For example, a set of sample data comprised of engine speed, engine air amount, engine injected fuel amount, MAP, engine volumetric efficiency, engine air-fuel ratio as determined from an oxygen sensor, and fuel pressure are stored to memory every 1 ms during an engine start. Method 400 proceeds to 420 after data set storage to memory has been scheduled.

At 420, method 400 judges whether or not selected engine stopping conditions are present to store vehicle data. Engine stopping conditions may include time since an engine stop request, engine speed less than a threshold engine speed, a change in MAP, engine load, and other conditions indicative of engine stopping. If method 400 judges that selected engine stopping conditions are present, the answer is yes and method 400 proceeds to 422. Otherwise, the answer is no and method 400 proceeds to 424.

At 422, method 400 acquires (e.g., stores to memory) selected data at selected sample intervals. For example, a set of sample data comprised of engine speed, engine air amount, engine injected fuel amount, MAP, engine volumetric efficiency, engine air-fuel ratio as determined from an oxygen sensor, and fuel pressure are stored to memory every 1 ms during an engine stop. Method 400 proceeds to 424 after data set storage to memory has been scheduled.

At 424, method 400 judges whether or not selected sensor and/or actuator conditions are present to store vehicle data. Sensor and/or actuator conditions may include but are not limited to conditions when sensor and/or actuator data is expected to include less than a threshold amount of error based on sensor and/or actuator specifications. If method 400 judges that selected sensor and/or actuator conditions are present, the answer is yes and method 400 proceeds to 426. Otherwise, the answer is no and method 400 proceeds to 428.

At 426, method 400 acquires (e.g., stores to memory) selected data at selected sample intervals. For example, a set of sample data comprised of engine speed, engine air amount, engine injected fuel amount, MAP, engine volumetric efficiency, engine air-fuel ratio as determined from an oxygen sensor, ignition timing, EGR amount, fuel vapor flow, and fuel pressure are stored to memory every 1 ms during an engine start. Method 400 proceeds to 428 after data set storage to memory has been scheduled.

At 428, a data transmission scheduler as described in FIG. 3 judges whether or not to transmit data to an off board processor. The data scheduler may transmit data in response to predetermined conditions or in response to specific events. For example, the data scheduler may transmit data after a predetermined number of miles is traveled, time since the vehicle was new, in response to an error condition, or in response to a request from the off board processor. If method 400 judges conditions are present to transmit data, the answer is yes and method 400 proceeds to 430. Otherwise, the answer is no and method 400 exits.

At 430, method 400 processes sensor, actuator, and model data from vehicle, engine, and fuel systems. In one example, method 400 processes data to correct fuel system and air charge system errors in response to an oxygen sensor that outputs data that may be responsive to both the fuel delivery system and the air charge system. Specifically, a static model of the engine including a base calibration that matches the calibration structure programmed into the vehicle. The revised calibration is determined by calculating an expected air-fuel ratio error for each data point of vehicle data. For example, vehicle data are input to the static engine model in the off board processor and the off board processor outputs modeled air-fuel error. The air fuel ratio error in the static engine model is determined by comparing the expected air-fuel error determined by the off board processor to the air-fuel error reported by the vehicle. For example, the vehicle air-fuel error is subtracted from the modeled air-fuel error to determine error in the static engine model. The engine model calibration parameters are then adjusted to reduce the modeling error. The revised vehicle calibration is based on the adjusted engine model calibration. The adjustment of vehicle calibration parameters may include weighing the air-fuel errors at different operating points differently based on the density (e.g., number of data points) of vehicle data to reduce the possibility of over-fitting vehicle operating conditions where there are a greater number of data points. Further, the adjustment of vehicle calibration parameters may include use of a priori information to weigh selected engine operating conditions more than other engine operating conditions. Method 400 proceeds to 432 after vehicle, engine, and fuel system data is processed.

At 432, method 400 adjusts actuator parameters in response to data processed at 430. In one example, actuator transfer functions are adjusted in response to processed data. For example, if an engine air amount is less than expected at a specified throttle position, the throttle position transfer function may be adjusted so that an estimate of air flow through the throttle is reduced at a particular throttle position. Transfer functions of any actuator described in FIG. 1 may be adjusted in a similar manner. Method 400 proceeds to 434 after actuator parameters are adjusted.

At 434, method 400 adjusts sensor parameters in response to data processed at 430. In one example, sensor transfer functions are adjusted in response to processed data. For example, if an engine air fuel ratio is greater than expected at specified air meter output value, the air meter transfer function may be adjusted so that an estimate of air flow through the air meter is greater than previously indicated by the air meter transfer function at the particular air meter output. Transfer functions of any sensor described in FIG. 1 may be adjusted in a similar manner. Method 400 proceeds to 436 after sensor parameters are adjusted.

At 436, method 400 adjusts model parameters in response to data processed at 430. In one example, an inducted engine air amount model parameters are adjusted in response to processed data. For example, if an engine air fuel ratio is greater than expected at specified engine operating condition, the engine air amount model transfer function may be adjusted so that an estimate of air flow through the engine is greater than previously indicated by the engine air amount model at the particular engine operating conditions. Models having parameters that may be adapted include but are not limited to an engine air amount model, exhaust temperature models, transient fuel models, engine torque model, engine emissions model, and other vehicle and engine models. Method 400 proceeds to 438 after sensor parameters are adjusted.

At 438, method 400 transmits the adjusted parameters from the off board processor to the vehicle controller. The off board processor may transmit updated parameters via satellite or infrastructure. Method 400 proceeds to 440 after vehicle, engine, and fuel system parameters are transmitted to the vehicle controller.

At 440, method 400 operates the vehicle in response to updated parameters. For example, if the fuel injector transfer function was adjusted by the off board processor, fuel injector activation time is adjusted in response to the revised transfer function. Similarly, models and sensors are interpreted and used with the revised parameters so as to update model and sensor output values. Method 400 proceeds to exit after the vehicle is operated in response to updated parameters.

Thus, the method of FIG. 4 provides for a method for a vehicle, comprising: collecting data without driver input from a single source that is correlated with two regulated engine inputs while the vehicle is on a road; processing the data off-board the vehicle into control adjustments for the two regulated engine inputs; and operating the vehicle in response to the control adjustments. The method includes where the single source is an exhaust gas oxygen sensor. The method also includes where the first of the two regulated inputs is a fuel mass quantity, and where the second of the two regulated inputs is an air mass quantity.

In some examples, the method includes where the control adjustments include adjustments to two transfer functions of two actuators. The method also includes where a first actuator of the two actuators is a throttle, and where the second actuator is a fuel injector. The method includes where the control adjustments include adjustments to an accelerator pedal position transfer function and an air sensor. The method includes where the data is processed in a computer that processes data from a plurality of vehicles traveling on the road, and where the vehicle is not owned by a vehicle manufacturer.

The method of FIG. 4 also provides for a method for a vehicle, comprising: collecting air-fuel data, fuel injection data, air amount data in a vehicle controller; transmitting the air-fuel data, fuel injection data, air amount data to a remote computer, the remote computer adjusting a control parameter in response to the air-fuel data, fuel injection data, and air amount data, the remote computer processing data from a plurality of vehicles; and operating the vehicle in response to the control parameter.

In some examples, the method includes where the control parameter is an engine air amount control parameter. The method includes where the engine air amount parameter is a throttle transfer function. The method includes where the engine air amount parameter is an air amount sensor transfer function. The method includes where the engine air amount parameter is an engine volumetric efficiency related transfer function. The method includes where the air-fuel data, fuel injector data, and air amount data is separated into steady state data and transient data. The method includes where the air-fuel data, fuel injector data, and air amount data is separated into engine stopping data and engine starting data.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for a vehicle, comprising:
collecting air-fuel data, fuel injection data, and air amount data in a vehicle controller during engine starting in response to a command from an off-board processor;
storing the air-fuel data, fuel injection data, and air amount data into memory allocated for engine starting data, the memory separate from other data memory;
during a transmission of data, transmitting only the air-fuel data, fuel injection data, and air amount data from the memory reserved for engine starting data to the off-board processor, the off-board processor adjusting a control parameter in response to the air-fuel data, fuel injection data, and air amount data, the off-board processor processing data from a plurality of vehicles; and
operating the vehicle in response to the control parameter.

2. The method of claim 1, where the control parameter is an engine air amount control parameter, and further comprising collecting vehicle sensor data when sensor data error is expected to be less than a threshold error amount.

3. The method of claim 2, where the engine air amount control parameter is a throttle transfer function, and further comprising grouping the vehicle sensor data into memory allocated for low sensor error data, the memory allocated for low sensor error data apart from memory storing engine starting data.

4. The method of claim 2, where the engine air amount control parameter is an air amount sensor transfer function.

5. The method of claim 2, where the engine air amount control parameter is an engine volumetric efficiency related transfer function.

6. The method of claim 1, where the air-fuel data, fuel injection data, and air amount data is separated into steady state data and transient data.

7. The method of claim 1, where the air-fuel data, fuel injection data, and air amount data is separated into engine stopping data and engine starting data.

* * * * *